United States Patent

Kwak et al.

[11] Patent Number: 5,521,256
[45] Date of Patent: May 28, 1996

[54] PROCESS FOR HYDROLYZING AND NEUTRALIZING A CROSSLINKED POLYMER OF MALEIC ANHYDRIDE AND A $C_1$–$C_5$ ALKYL VINYL ETHER, OPTIONALLY WITH A HYDROPHOBIC MONOMER, SUBSTANTIALLY INSTANTLY AT ROOM TEMPERATURE

[75] Inventors: Yoon T. Kwak, Wayne; Stephen L. Kopolow, Plainsboro, both of N.J.

[73] Assignee: ISP Investments Inc., Wilmington, Del.

[21] Appl. No.: 441,860

[22] Filed: May 16, 1995

[51] Int. Cl.$^6$ ........................................... C08F 8/12
[52] U.S. Cl. .................. 525/378; 525/327.6; 525/327.8
[58] Field of Search ............................................... 525/378

[56] References Cited

U.S. PATENT DOCUMENTS

| | | | |
|---|---|---|---|
| 3,684,776 | 8/1972 | Field et al. | 525/327.6 |
| 4,517,329 | 5/1985 | Mottus | 525/327.6 |
| 5,178,143 | 1/1993 | Kwak et al. | 252/500 |

Primary Examiner—Bernard Lipman
Attorney, Agent, or Firm—Walter Katz; Marilyn J. Maue; Joshua J. Ward

[57] ABSTRACT

A process for hydrolyzing and neutralizing a crosslinked polymer of maleic anhydride and a $C_1$–$C_5$ alkyl vinyl ether, and, optionally a hydrophobic monomer, in anhydride form substantially instantaneously in water at room temperature, which comprises reacting about 0.1–4% by weight of the crosslinked polymer in water at room temperature with ammonium hydroxide base, with stirring, to form a gel solution.

6 Claims, No Drawings

PROCESS FOR HYDROLYZING AND NEUTRALIZING A CROSSLINKED POLYMER OF MALEIC ANHYDRIDE AND A $C_1$-$C_5$ ALKYL VINYL ETHER, OPTIONALLY WITH A HYDROPHOBIC MONOMER, SUBSTANTIALLY INSTANTLY AT ROOM TEMPERATURE

BACKGROUND OF THE INVENTION

1. Field of the Invention

This invention relates to crosslinked polymers of maleic anhydride and alkyl vinyl ethers, and, more particularly to a process for hydrolyzing and neutralizing such polymers substantially instantly at room temperature.

2. Description of the Prior Art

Crosslinked and polymers of maleic anhydride and a $C_1$-$C_5$ alkyl vinyl ether, e.g. methyl vinyl ether, and, optionally, a hydrophobic monomer, are useful thickener and emulsion stabilizers. However, these polymers must undergo hydrolysis before thickening and gelation can occur to form a clear or translucent, viscous gel in water. Kwak et al U.S. Pat. No. 5,178,143. Usually the polymer resin is supplied to the user as a hydrophobic powder designed to wet easily. As a powder the resin is in its anhydride form. Hydrolysis converts the anhydride group to the diacid which causes the polymer to begin to uncoil. The hydrolysis process requires (a) dispersing the polymer in water at room temperature for 24-48 hours; (b) by heating the polymer in water at 65°-80° C. for 30-90 minutes; or (c) heating the polymer in dilute sodium hydroxide solution at 65° for 30 minutes.

When base is added to the hydrolyzed (diacid) form of the resin, the base is consumed and the crosslinked polymer structure expands until the diacid is fully neutralized. High viscosity gels can be formed at or near full neutralization in the pH range of 5.5-8.5. The gel viscosity is lower for only partially neutralized crosslinked polymers, and for gel solutions having excess base which acts like a salt to reduce charge interaction on the polyelectrolyte causing the polymer to begin to coil.

Accordingly, it is an object of this invention to provide a process for preparing hydrolyzed, suitably neutralized gel solutions of crosslinked polymers of maleic anhydride and a $C_1$-$C_5$ alkyl vinyl ether substantially instantaneously (less than 1 minute) at room temperature (about 20° C.) to form a clear gel solution at a pH of 5-12, having a Brookfield viscosity of at least 20,000 cps.

A specific object of the invention is to provide a process for hydrolyzing and neutralizing polymers of crosslinked maleic anhydride and methyl vinyl ether in a base substantially instantaneously at room temperature.

SUMMARY OF THE INVENTION

A process for hydrolyzing and neutralizing a crosslinked polymer of maleic anhydride and a $C_1$-$C_5$ alkyl vinyl ether, and, optionally a hydrophobic monomer, in anhydride form, substantially instantaneously in water at room temperature, which comprises reacting about 0.1-4% by weight of the crosslinked polymer in water at room temperature with ammonium hydroxide base, with stirring, to form a gel solution.

DESCRIPTION OF THE INVENTION

In accordance with the invention, it has been discovered herein that hydrolyzed and neutralized crosslinked polymers of maleic anhydride and a $C_1$-$C_5$ alkyl vinyl ether, optionally with a hydrophobic monomer, can be made substantially instantaneously at room temperature by carrying out the desired hydrolysis and neutralization with ammonium hydroxide solution. In contrast to ammonium hydroxide, other bases such as NaOH, KOH, triethanolamine, tetrahydroxypropylethylene diamine and triethylamine require long periods of heating at elevated temperatures, or do not produce any gel at all.

The crosslinked copolymer of maleic anhydride and a $C_1$-$C_5$ alkyl vinyl ether is prepared by slurry polymerization of the monomers in the presence of an organic free radical—generating initiator and a suitable amount of a crosslinking agent in a cosolvent system which is a mixture of a carboxylic acid ester and a saturated hydrocarbon, such as a mixture of ethyl acetate and cyclohexane, preferably in a weight ratio of about 35 to 55% ethyl acetate and 45 to 65% cyclohexane.

The amount of crosslinking agent generally present is about 1 to 5 mole percent based on the monovinyl alkyl ether component of the copolymer.

Suitable crosslinking agents include the divinyl ethers of an aliphatic diol, e.g. the divinyl ethers of 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-unidecanediol, and 1,12-dodecanediol; the divinyl ethers of diethylene glycol, triethylene glycol, tetraethylene glycol, pentaethylene glycol, hexaethylene glycol, heptaethylene glycol, octaethylene glycol, nonaethylene glycol and decaethylene glycol, and other polyalkylene glycols having a molecular weight of up to about 5,900. Other suitable crosslinking agents include 1,5-hexadiene; 1,7-octadiene; 1,9-decadiene; 1,13-tetradecadiene; divinylbenzene; N,N'-bis-methylene acrylamide; acrylates such as polyethylene glycol diacrylate, trimethylolpropane triacrylate and propylene glycol diacrylate; and polyhydric alcohols esterified once or twice with acrylic acid, triallylamine, tetraallylethylenediamine, diallyl phthalate, and the like.

Optionally, a hydrophobic monomer may be included in the polymer, preferably a $C_8$-$C_{24}$ alkyl acrylate or methacrylate, or a $C_8$-$C_{24}$ alkyl acrylamide or methacrylamide.

EXAMPLE 1

Preparation of Crosslinked Polymer

A reactor was precharged with 550 g. of a 50:50 weight % mixture of ethyl acetate and cyclohexane as cosolvent system, and 1,9-decadiene as crosslinking agent. The reactor then was purged with nitrogen, heated to 58° C., and charged with initiator Lupersol-11 initiator (t-butyl peroxypivalate) at a 0.15 to 2% by weight level based on maleic anhydride monomer. Then 60 g. molten maleic anhydride and 47.6 g. methyl vinyl ether, optionally with a hydrophobic monomer such as lauryl methacrylate, were fed separately (or through a common inlet) into the reactor over a 2 to 3 hour period. The reactants were held at 58° C. for an additional 1 to 3 hours, cooled, vented and discharged. The resulting slurry of the crosslinked polymer product in the cosolvent at an 18 to 25% solids level was filtered and dried.

INVENTION EXAMPLES

EXAMPLE 2

To 1 g. of the polymer in 98.3 g. of water at room temperature was added 0.7 g. of 30% $NH_4OH$ with stirring. A gel was formed in less than 1 minute. The Brookfield viscosity of the resultant gel was 49,200 cps (RV #7,20). The pH was 7.96.

EXAMPLES 3–12

See Table 1 below.

TABLE 1

| Ex. No. | Polymer | Amt (g) | Amt 30% NH₄OH (g) | Temp. (°C.) | Total Water (g) | Time for Gel Formation (min) | Gel Viscosity (cps) | pH |
|---|---|---|---|---|---|---|---|---|
| 3 | PVM/MA | 0.50 | 0.34 | 20 | 99.16 | <1 | 48,800 | 6.72 |
| 4 | PVM/MA/LMA | 1 | 0.82 | 20 | 98.08 | <1 | 21,000 | 7.17 |
| 5 | PVM/MA/LMA | 1 | 1 | 20 | 98 | <1 | 21,700 | 9.20 |
| 6 | PVM/MA/LMA | 1 | 1.2 | 20 | 97.8 | <1 | 22,200 | 9.37 |
| 7 | PVM/MA/LMA | 1 | 1.6 | 20 | 97.4 | <1 | 25,100 | 9.84 |
| 8 | PVM/MA/LXA | 1 | 2 | 20 | 98 | <1 | 24,100 | 10.00 |
| 9 | PVM/MA/LMA | 1 | 0.8 | 20 | 98.2 | <1 | 27,400 | 7.22 |
| 10 | PVM/MA/LMA | 1 | 0.6 | 20 | 98.4 | <1 | 46,600 | 6.02 |
| 11 | PVM/MA/LMA | 1 | 0.6 | 20 | 98.4 | <1 | 41,400 | 5.93 |
| 12 | PVM/MA/LMA | 1 | 0.65 | 20 | 98.35 | <1 | 31,200 | 6.10 |

The procedure of Example 2 was repeated using different bases in place of 30% ammonium hydroxide. The desired hydrolysis and neutralization either did not take place or took an inordinately long time period. The results are shown in Table 2 below.

TABLE 2

COMPARATIVE EXAMPLES A–D

| Ex. No. | Polymer | Amt (g) | Base | Amt (g) | Temp (°C.) | Time (hrs) | Viscosity (cps) | pH |
|---|---|---|---|---|---|---|---|---|
| A | PVM/MA | 1 | 10% NAOH | 2.8 | 20 | 19 | 42,000 | |
| B | PVM/MA/LMA | 1 | 10% NAOH | 2.7 | 80 | 0.8 | 37,500 | 6.90 |
| C | PVM/MA/LMA | 1 | TEA | 1.0 | 20 | 24 | No gel forms | 7.17 |
| D | PVM/MA/LMA | 1 | TEA | 1.0 | 80 | 1.0 | 39,400 | 7.30 |

While the invention has been described with particular reference to certain embodiments thereof, it will be understood that changes and modifications may be made which are within the skill of the art. Accordingly, it is intended to be bound only by the following claims, in which:

What is claimed is:

1. A process for hydrolyzing and neutralizing a crosslinked polymer of maleic anhydride and a $C_1$–$C_5$ alkyl vinyl ether, and, optionally a hydrophobic monomer, in anhydride form substantially instantaneously in water at room temperature, which comprises reacting about 0.1–4% by weight of the crosslinked polymer in water at room temperature with ammonium hydroxide base, with stirring, to form a gel solution.

2. A process according to claim 1 wherein said hydrophobic monomer is a $C_8$–$C_{24}$ alkyl acrylate or methacrylate, an alkyl acrylamide or methacrylamide.

3. A process according to claim 1 wherein said concentrated ammonium hydroxide solution is a 28–30% by weight $NH_4OH$ solution.

4. A process according to claim 1 wherein the gel solution is formed in less than a minute.

5. A process according to claim 1 which is carried out with about 1 part of polymer, about 0.6 part of 30% $NH_4OH$ and 98.4 part of water.

6. A process according to claim 1 wherein the pH of the resulting gel solution is about pH 6–8 and the resultant gel has a Brookfield viscosity of 20,000 to 100,000 cps.

* * * * *